(12) United States Patent
Keiter et al.

(10) Patent No.: US 11,283,771 B2
(45) Date of Patent: Mar. 22, 2022

(54) SECURE DATA TRANSFER SYSTEM WITH INTEGRATED PROXY GATEWAY

(71) Applicant: BANK OF AMERICA CORPORATION, Charlotte, NC (US)

(72) Inventors: Kelly Renee-Drop Keiter, Waxhaw, NC (US); Christopher Daniel Birch, Dayton, OH (US); Susan R. Hart, Addison, TX (US); Lisa Matthews, Charlotte, NC (US); Cody Dean Searl, Pineville, NC (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 91 days.

(21) Appl. No.: 16/860,783

(22) Filed: Apr. 28, 2020

(65) Prior Publication Data

US 2021/0336935 A1  Oct. 28, 2021

(51) Int. Cl.
*H04L 67/56* (2022.01)
*H04L 29/06* (2006.01)

(52) U.S. Cl.
CPC .......... *H04L 63/0281* (2013.01); *H04L 67/28* (2013.01)

(58) Field of Classification Search
CPC ............................ H04L 63/0281; H04L 67/28
See application file for complete search history.

(56) References Cited

U.S. PATENT DOCUMENTS

| 7,483,858 | B2 | 1/2009 | Foran et al. |
|---|---|---|---|
| 7,499,888 | B1 | 3/2009 | Tu et al. |
| 7,566,002 | B2 | 7/2009 | Love et al. |
| 7,610,216 | B1 | 10/2009 | May et al. |
| 8,160,935 | B2 | 4/2012 | Bui |
| 8,285,656 | B1 | 10/2012 | Chang et al. |
| 9,189,772 | B2 | 11/2015 | Levit |
| 10,333,934 | B1 | 6/2019 | Fox et al. |
| 2010/0130183 | A1* | 5/2010 | Kretz ............... H04M 1/72406 455/414.3 |
| 2010/0318784 | A1* | 12/2010 | Rao ..................... H04L 63/0823 713/151 |
| 2011/0276479 | A1 | 11/2011 | Thomas |
| 2012/0003604 | A1 | 1/2012 | Moriyama et al. |
| 2013/0297398 | A1 | 11/2013 | Brown et al. |
| 2014/0164083 | A1 | 6/2014 | Wilkes |
| 2016/0018914 | A1 | 1/2016 | Kuo et al. |

(Continued)

*Primary Examiner* — Gil H. Lee

(74) *Attorney, Agent, or Firm* — Moore & Van Allen PLLC; R.W. McCord Rayburn

(57) ABSTRACT

A system for secure data transfer is provided. The system is configured to: generate a database of verified interaction providers comprising verified provider information; determine that a user device has accessed a data transfer location associated with an interaction provider; install a proxy server over the data transfer location, wherein data transfer traffic between the user device and the interaction provider is routed through and monitored by the proxy server; determine, via the proxy server, that the user device has requested an interaction at the data transfer location, the interaction comprising a data transfer; determine that the interaction provider associated with the data transfer location is in the database of verified interaction providers; and in response to determining that the interaction provider is in the database, complete the data transfer through the proxy server.

20 Claims, 5 Drawing Sheets

(56) References Cited

U.S. PATENT DOCUMENTS

| | | | |
|---|---|---|---|
| 2016/0366137 A1* | 12/2016 | Borgards | H04L 67/34 |
| 2017/0163525 A1* | 6/2017 | Fedor | H04L 45/22 |
| 2017/0337602 A1 | 11/2017 | Davis | |
| 2017/0345009 A1 | 11/2017 | Unnerstall | |
| 2018/0075437 A1 | 3/2018 | Snyder et al. | |
| 2019/0114643 A1 | 4/2019 | Dewitt et al. | |

* cited by examiner

SECURE DATA TRANSFER SYSTEM WITH INTEGRATED PROXY GATEWAY

BACKGROUND

Data transfers and other electronic interactions are increasingly executed between user computing devices for a variety of reasons. Depending on the interaction, data transferred between devices over a network may be sensitive and require secure communication. Traditional methods of secure data transfers typically lengthen interactions by requiring additional security checks that must be performed or provided by the involved devices at the time of interaction. Therefore, there exists a need for an integrated data transfer method for securing completing interactions between devices and a system for executing the same.

BRIEF SUMMARY

The following presents a simplified summary of one or more embodiments of the invention in order to provide a basic understanding of such embodiments. This summary is not an extensive overview of all contemplated embodiments and is intended to neither identify key or critical elements of all embodiments, nor delineate the scope of any or all embodiments. Its sole purpose is to present some concepts of one or more embodiments in a simplified form as a prelude to the more detailed description that is presented later.

A system for secure data transfer is provided. The system comprises: a memory device with computer-readable program code stored thereon; a communication device connected to a network; a processing device, wherein the processing device is configured to execute the computer-readable program code to: generate a database of verified interaction providers comprising verified provider information; determine that a user device has accessed a data transfer location associated with an interaction provider; install a proxy server over the data transfer location, wherein data transfer traffic between the user device and the interaction provider is routed through and monitored by the proxy server; determine, via the proxy server, that the user device has requested an interaction at the data transfer location, the interaction comprising a data transfer; determine that the interaction provider associated with the data transfer location is in the database of verified interaction providers; and in response to determining that the interaction provider is in the database, complete the data transfer through the proxy server.

In one specific embodiment, The system of claim 1, wherein the proxy server is an application installed on the user device. In another embodiment, the data transfer location is a first application installed on the user device and the proxy server is a second application installed on the user device, wherein the proxy server is configured to communicate with the data transfer location on the user device to complete the data transfer. In yet another embodiment, the proxy server is configured to input user commands to the data transfer location on behalf of the user device.

In yet another embodiment, the processing device is further configured to execute the computer-readable program code to automatically complete a portion of the data transfer in response to determining that the interaction provider is in the database of verified interaction providers. In yet another embodiment, automatically completing the portion of the data transfer further comprises populating the data transfer location with interaction data associated with the user device or the interaction provider.

In yet another embodiment, the processing device is further configured to execute the computer-readable program code to: modify an appearance of the data transfer location based on the interaction provider, wherein the appearance of the data transfer location is modified with at least one of the verified provider information and user information associated with a user of the user device; and present the modified appearance of the data transfer location to the user device.

In yet another embodiment, the proxy server is configured to monitor the data transfer traffic between the user device and a plurality of data transfer locations with approval of the user device.

A computer-implemented method for secure data transfer is also provided. The computer-implemented method comprises: generating a database of verified interaction providers comprising verified provider information; determining that a user device has accessed a data transfer location associated with an interaction provider; installing a proxy server over the data transfer location, wherein data transfer traffic between the user device and the interaction provider is routed through and monitored by the proxy server; determining, via the proxy server, that the user device has requested an interaction at the data transfer location, the interaction comprising a data transfer; determining that the interaction provider associated with the data transfer location is in the database of verified interaction providers; and in response to determining that the interaction provider is in the database, completing the data transfer through the proxy server.

In one specific embodiment, the proxy server is an application installed on the user device. In yet another embodiment, the data transfer location is a first application installed on the user device and the proxy server is a second application installed on the user device, wherein the proxy server is configured to communicate with the data transfer location on the user device to complete the data transfer. In yet another embodiment, the proxy server is configured to input user commands to the data transfer location on behalf of the user device.

In yet another embodiment, the computer-implemented method further comprises automatically completing a portion of the data transfer in response to determining that the interaction provider is in the database of verified interaction providers. In yet another embodiment, automatically completing the portion of the data transfer further comprises populating the data transfer location with interaction data associated with the user device or the interaction provider.

In yet another embodiment, the computer-implemented method further comprises: modifying an appearance of the data transfer location based on the interaction provider, wherein the appearance of the data transfer location is modified with at least one of the verified provider information and user information associated with a user of the user device; and presenting the modified appearance of the data transfer location to the user device.

In yet another embodiment, the proxy server is configured to monitor the data transfer traffic between the user device and a plurality of data transfer locations with approval of the user device.

A computer program product for secure data transfer is also provided. The computer program product comprises a non-transitory computer-readable medium comprising computer-readable instructions, the computer-readable instructions, when executed by a processing device, cause the processing device to: generate a database of verified interaction providers comprising verified provider information; determine that a user device has accessed a data transfer location associated with an interaction provider; install a proxy server over the data transfer location, wherein data transfer traffic between the user device and the interaction provider is routed through and monitored by the proxy server; determine, via the proxy server, that the user device has requested an interaction at the data transfer location, the interaction comprising a data transfer; determine that the interaction provider associated with the data transfer location is in the database of verified interaction providers; and in response to determining that the interaction provider is in the database, complete the data transfer through the proxy server.

In one specific embodiment, the proxy server is an application installed on the user device. In another embodiments, the data transfer location is a first application installed on the user device and the proxy server is a second application installed on the user device, wherein the proxy server is configured to communicate with the data transfer location on the user device to complete the data transfer.

In yet another embodiment, the computer-readable instructions, when executed by the processing device, further cause the processing device to automatically complete a portion of the data transfer in response to determining that the interaction provider is in the database of verified interaction providers.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
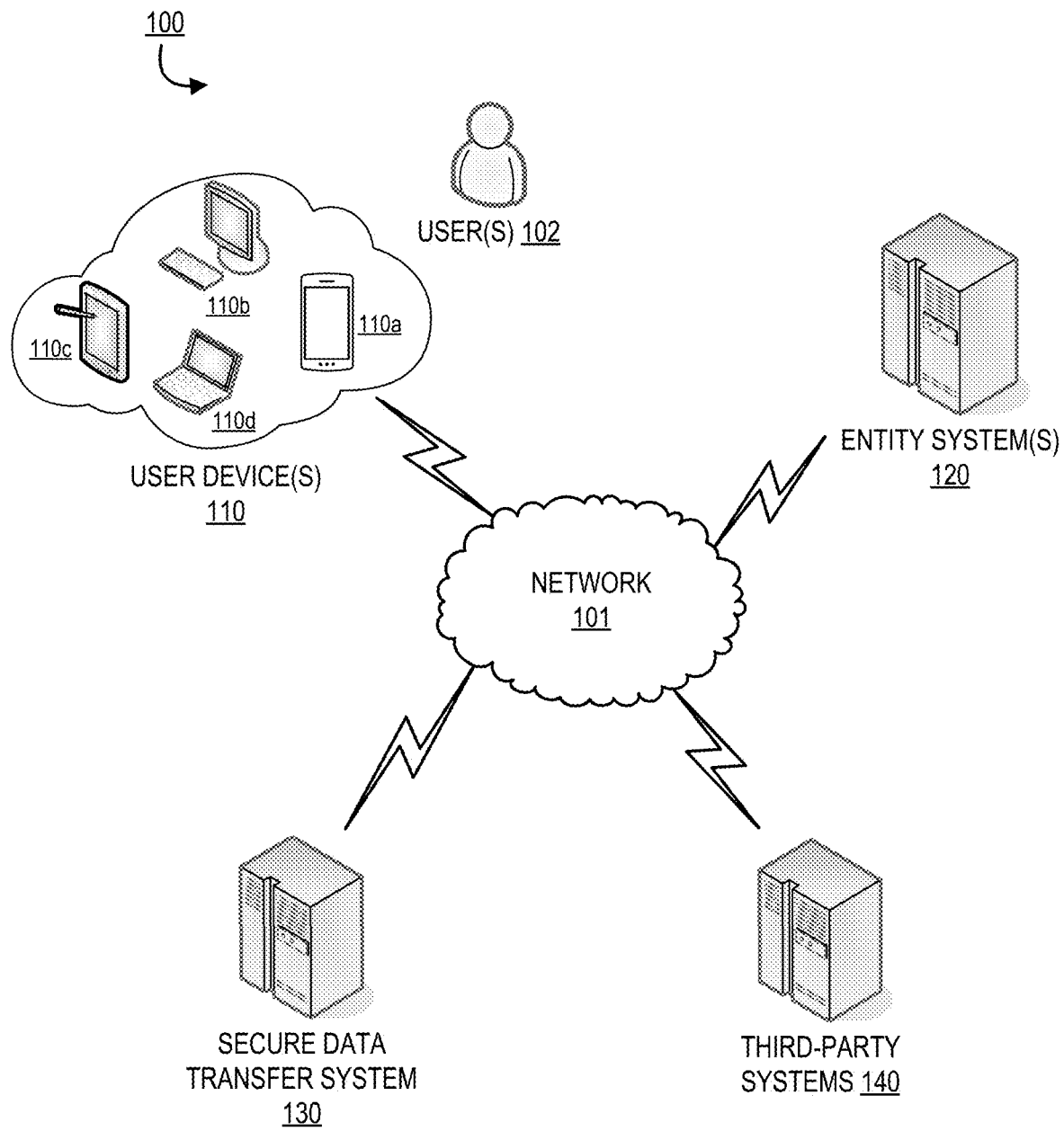
Figure 2:
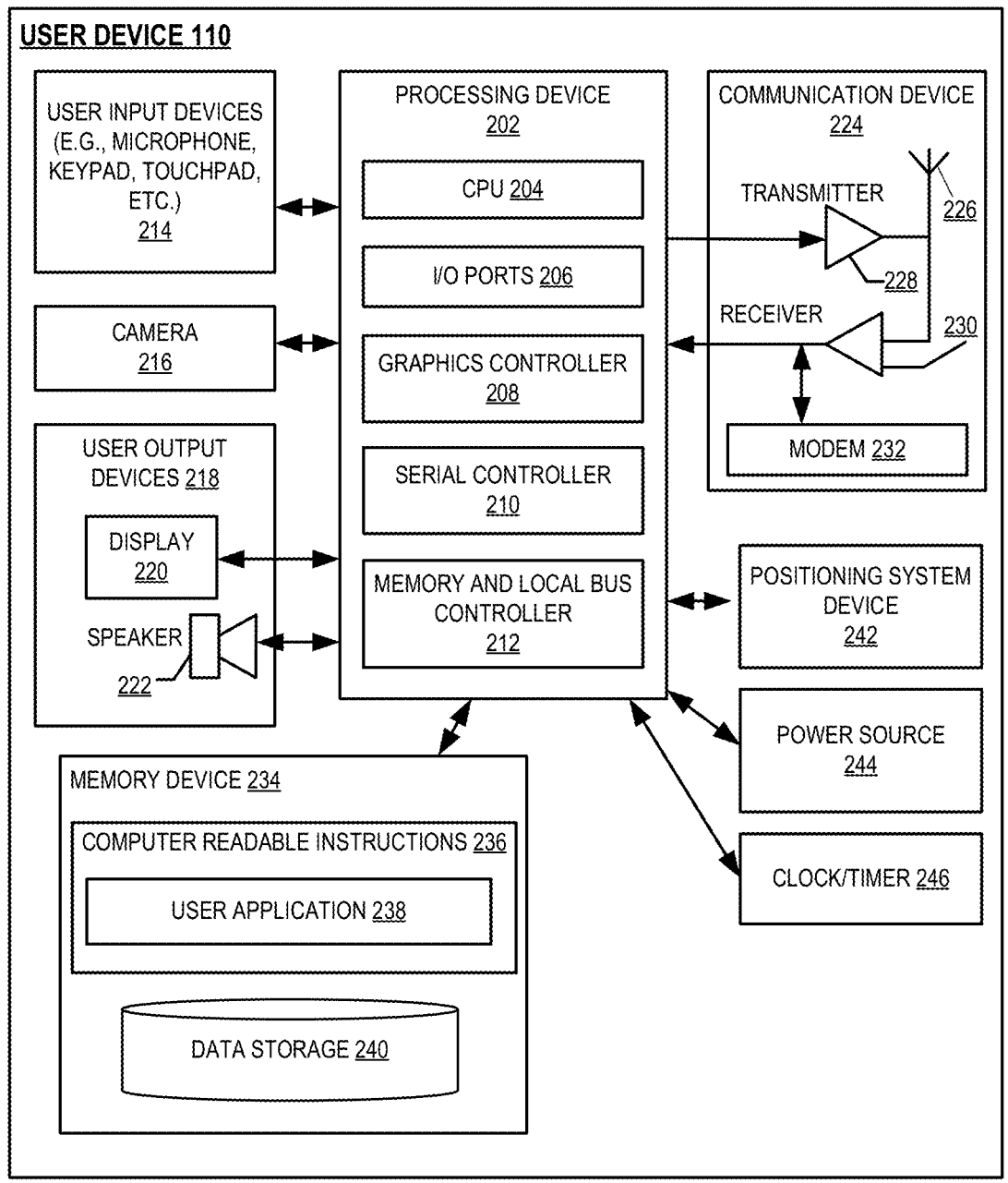
Figure 3:
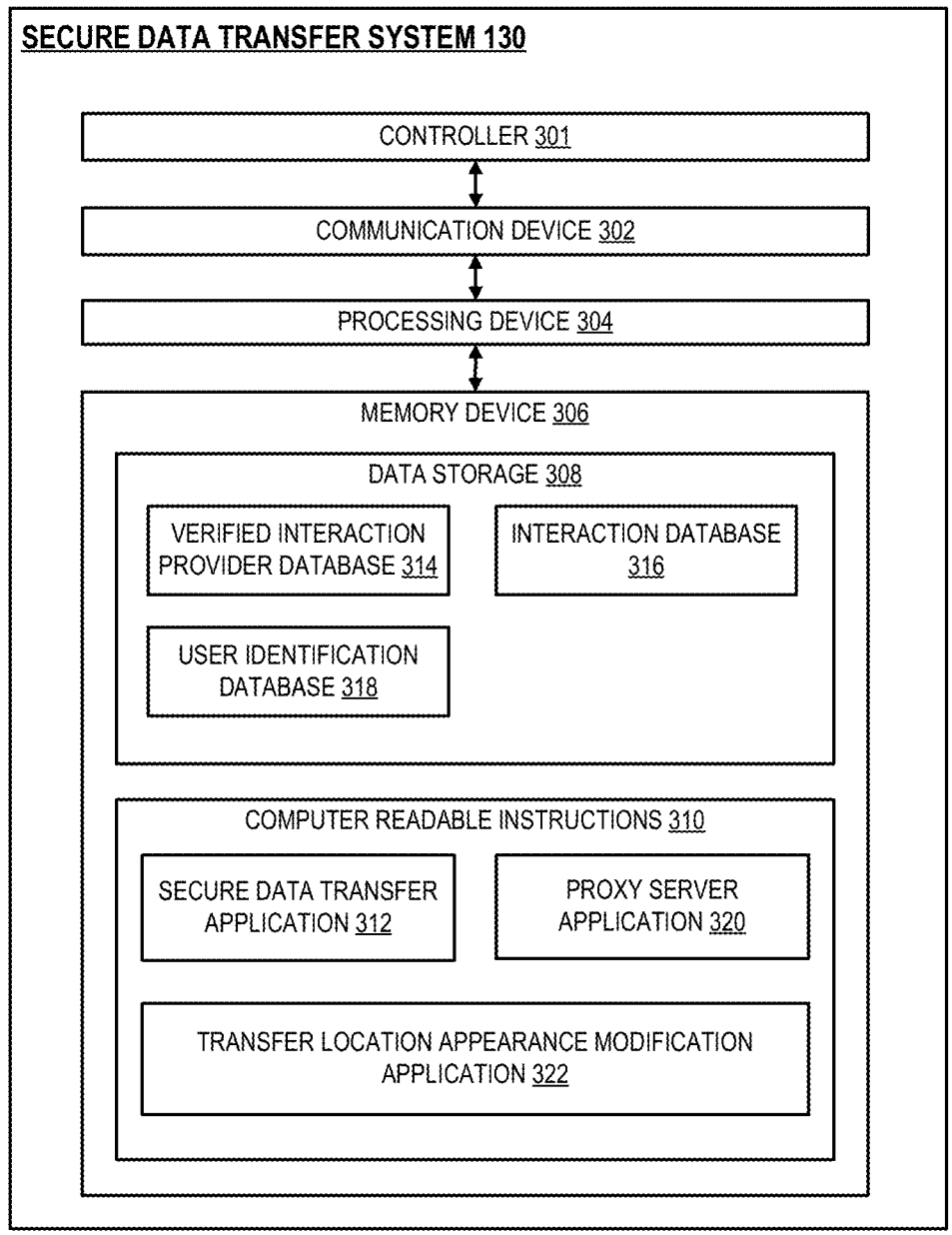
Figure 4:
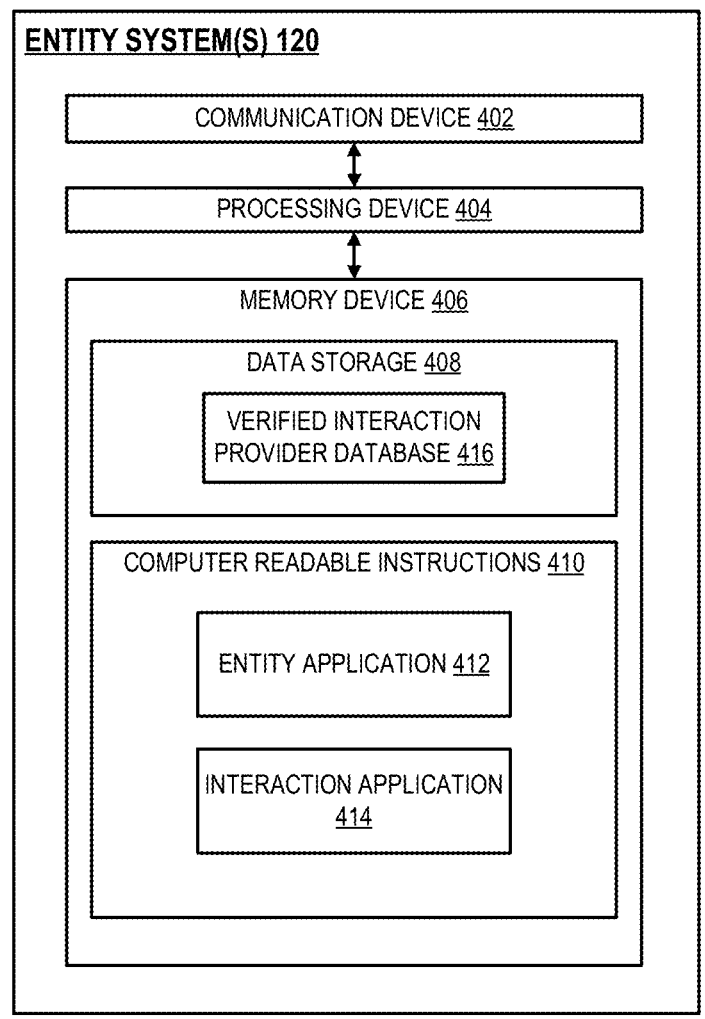
Figure 5:
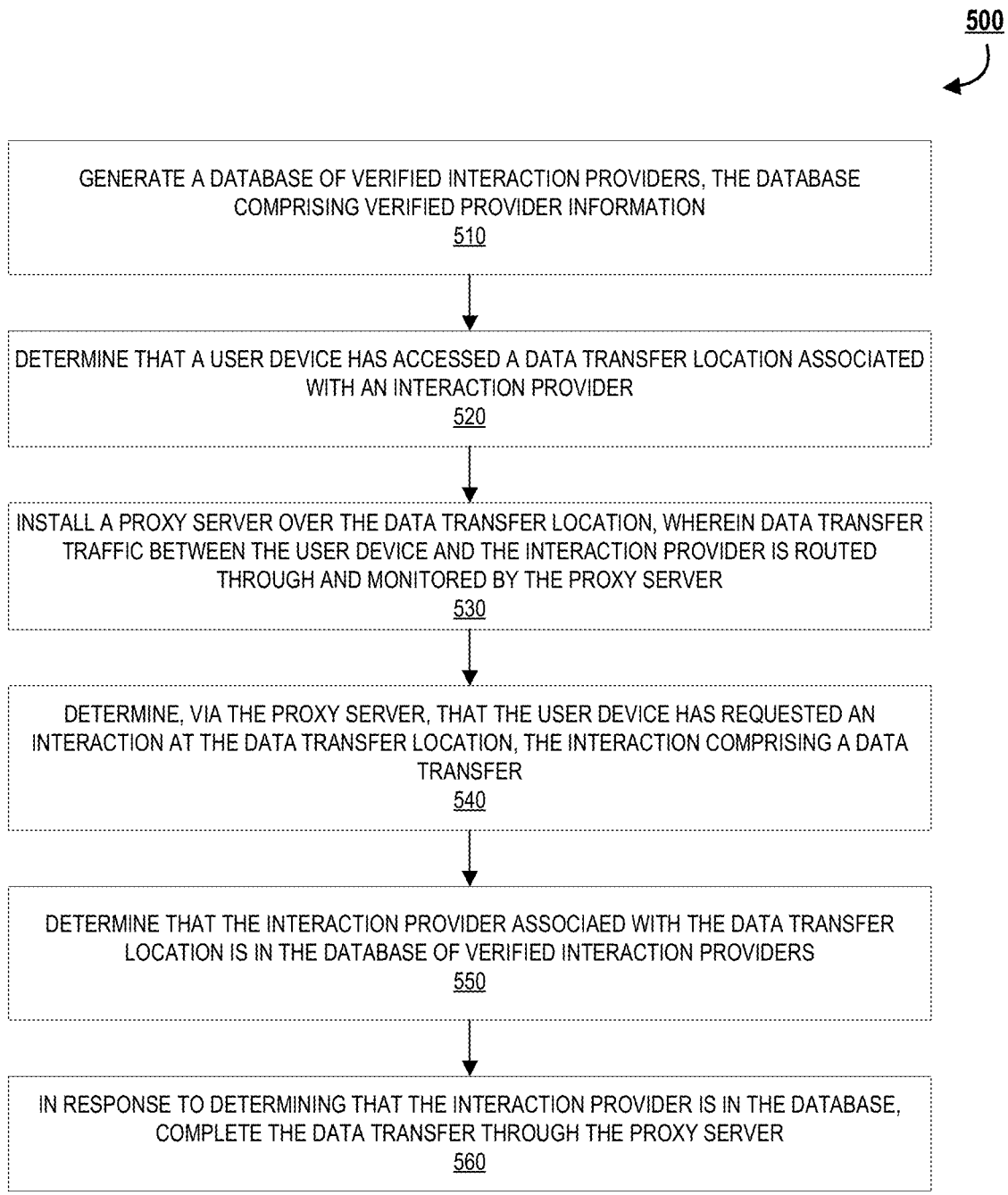

Having thus described embodiments of the invention in general terms, reference will now be made to the accompanying drawings, wherein:

FIG. 1 provides a secure data transfer system environment, in accordance with one embodiment of the invention;

FIG. 2 provides a secure data transfer environment leveraging device interaction zones, in accordance with one embodiment of the invention;

FIG. 3 provides a block diagram of a user device, in accordance with one embodiment of the invention;

FIG. 4 provides a block diagram of a secure data transfer system, in accordance with one embodiment of the invention; and FIG. 5 provides a high level process flow for completing a secure data transfer, in accordance with one embodiment of the invention.

DETAILED DESCRIPTION OF EMBODIMENTS OF THE INVENTION

Embodiments of the system, as described herein, leverage network communication gateway technology and other specific-use computer systems to provide a novel approach for securely completing data transfer interactions between devices by generating a database of verified interaction providers. The system is configured to collect and verify provider information to generate said database of trusted entities and/or users. While using the generated database, the system is configured to monitor data transfer traffic and other network communication with a user device that has allowed the system access. The system accomplishes this monitoring through the installation of a proxy server on the user device and/or over a data transfer location associated with a provider. In various embodiments, the proxy server may be embodied as hardware (e.g., a network appliance or box), software (e.g., a mobile application, a server application), or a combination of hardware and software across a system environment of networked devices. The proxy server acts as a middle layer between the user device and the provider to provide enhanced security. The system is configured to determine from the monitored communications that a user device has accessed a data transfer location associated with a provider. In some embodiments, if the identified interaction provider is in the database of verified interaction providers, the system is configured to complete a requested interaction with the user device (e.g., a data transfer or other communication).

In addition to monitoring the data stream between devices and authorizing interactions using the generated database, the present system is further configured to automatically complete portions of the data transfer itself using the information stored in the verified database in order to increase the speed at which interactions may be completed while still providing the enhanced security as previously discussed. In some embodiments, the system is configured to populate a data transfer location with interaction data associated with the user device, associated user, and/or the interaction provider. Furthermore, the system is configured to modify an appearance of the data transfer location based on this interaction data and present the modified appearance to a user. In this way, the system may present the data transfer location to the user device while retaining security and visual elements of another data transfer location associated with the system or a trusted, maintaining entity for increased user confidence while the user completes the interaction.

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to elements throughout. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on."

As used herein, the term "computing resource" may refer to elements of one or more computing devices, networks, or the like available to be used in the execution of tasks or processes. A computing resource may be used to refer to available processing, memory, and/or network bandwidth and/or power of an individual computing device as well a plurality of computing devices that may operate as a collective for the execution of one or more tasks (e.g., one or more computing devices operating in unison). In some embodiments, use resources such as computing resource may include an amount of use-time during which the resources are being utilized by the system and/or other systems and devices described herein.

As used herein, the term "user" may refer to any entity or individual associated with the secure data transfer system. In some embodiments, a user may be a computing device user, a phone user, a mobile device application user, a customer of an entity or business (i.e., an interaction provider), a system operator, and/or employee of an entity (e.g., a financial institution). In one embodiment, a user may be a customer with an associated device accessing a data transfer location associated with another user or entity (e.g., an interaction provider) to complete an interaction. In some embodiments, identities of an individual may include online handles, usernames, identification numbers (e.g., Internet protocol (IP) addresses), aliases, family names, maiden names, nicknames, or the like. In some embodiments, the user may be an individual or an organization (i.e., a charity, business, company, governing body, or the like).

As used herein the term "user device" may refer to any device that employs a processor and memory and can perform computing functions, such as a personal computer or a mobile device, wherein a mobile device is any mobile communication device, such as a cellular telecommunications device (i.e., a cell phone or mobile phone), a mobile Internet accessing device, or other mobile device. Other types of mobile devices may include laptop computers, tablet computers, wearable devices, cameras, video recorders, audio/video player, ATMs, global positioning system (GPS) devices, entertainment devices, or any combination of the aforementioned. The device may be used by the user to access the system directly or through one or more applications, an online portal, internet browser, virtual private network, or other connection channel. The user device comprises a display for providing a user interface to the user for interacting with an application and data transfer locations displayed on the device and presented to the user.

As used herein, the term "entity" may be used to include any organization or collection of users that may interact with the secure data transfer system. An entity may refer to a business, company, or other organization that either maintains or operates the system or requests use and accesses the system. In one embodiment, the entity may be a business or financial entity. The terms "financial institution" and "financial entity" may be used to include any organization that processes financial transactions including, but not limited to, banks, resource management firms, insurance companies and the like. In specific embodiments of the invention, use of the term "bank" is limited to a financial entity in which account-bearing customers conduct financial transactions, such as account deposits, withdrawals, transfers and the like. In other embodiments, an entity may be a business, organization, a government organization or the like that is not a financial institution. In some embodiment, an entity may be a business, vendor, or the like that provides a resource (e.g., goods, services, or other resources) to another user or entity via an interaction at an interaction location (e.g., within an application, a web site, brick-and-mortar location).

As used herein, "authentication information" may refer to any information that can be used to authenticate an identify a user. For example, a system may prompt a user to enter authentication information such as a username, a password, a personal identification number (PIN), a passcode, biometric information (e.g., voice authentication, a fingerprint, and/or a retina scan), an answer to a security question, a unique intrinsic user activity, such as making a predefined motion with a user device. This authentication information may be used to at least partially authenticate the identity of the user (e.g., determine that the authentication information is associated with the account) and determine that the user has authority to access an account or system. In some embodiments, the system may be owned or operated by an entity. In such embodiments, the entity may employ additional computer systems, such as authentication servers, to validate and certify resources inputted by the plurality of users within the system. In some embodiments, authentication information may refer to any information provided by a user, entity, interaction provider, or the like to verify an identify and/or status of the user, entity, interaction provider or the like. For example, in one embodiment, an interaction provider may provide the system with verifiable information associated with the existence or a standing of the provider, data security information (e.g., types of active protection employed by the entity), and other provider information. In some embodiments, the provider information is verified by the system through communication with one or more third party systems (e.g., regulating bodies or agencies, public records, or the like) configured to verify the provided information.

To "monitor" is to watch, observe, or check something for a special purpose over a period of time. The "monitoring" may occur periodically over the period of time, or the monitoring may occur continuously over the period of time. In some embodiments, a system may actively monitor a data source, data stream, database, or data archive, wherein the system reaches out to the database and watches, observes, or checks the database for changes, updates, and the like. In other embodiments, a system may passively monitor a database or data stream, wherein the database or data stream provides information to the system and the system then watches, observes, or checks the provided information. In some embodiments, "monitoring" may further comprise analyzing or performing a process on something such as a data source or data stream either passively or in response to an action or change in the data source or data stream. In a specific embodiment, monitoring may comprise analyzing one or more communication channels with one or more data transfer locations. Monitoring of user data streams is performed by the system with approval or authorization by the monitored user device and user.

As used herein, an "interaction" may refer to any action or communication between one or more users, one or more entities or institutions, and/or one or more devices or systems within the system environment described herein. For example, an interaction may refer to a user interaction with a system or device, wherein the user interacts with the system or device in a particular way. In one embodiment, interactions may be received or extracted through use interaction with a data stream (e.g., in real-time). In some embodiments, an interaction comprises a data transfer between devices or locations within the environment of the system described herein. For example, an interaction may require a transfer of user data or information between devices to direct an interaction or delivery of resources from a first location to a second location.

In some embodiments, an interaction may further include user interactions with a user interface of a user application (e.g., clicking, swiping, text or data entry, etc.), authentication actions (e.g., signing-in, username and password entry, PIN entry, etc.), account actions or events (e.g., account access, fund transfers, document or record views and/or transfers, etc.) and the like. In another example, an interaction may refer to a user communication via one or more channels (i.e., phone, email, text, instant messaging, brick-and-mortar interaction, and the like) with an entity and/or entity system to complete an operation or perform an action (e.g., complete a document). In yet another example, an interaction may comprise device interactions such as communication between one or more user devices, user interaction zones, and/or beacons configured for determining that the user devices are in a predetermined range or area.

FIG. 1 provides a secure data transfer system environment 100, in accordance with one embodiment of the invention. As illustrated in FIG. 1, secure data transfer system 130 is operatively coupled, via a network 101, to the user device(s) 110 (e.g., a plurality of user devices 110a-110d), the entity system(s) 120, and third party systems 140. In this way, the secure data transfer system 130 can send information to and receive information from the user device 110, the entity system 120, and the third party systems 140. In the illustrated embodiment, the plurality of user devices 110a-110d provide a plurality of communication channels through which the entity system 120 and/or the secure data transfer system 130 may communicate with the user 102 over the network 101.

FIG. 1 illustrates only one example of an embodiment of the system environment 100. It will be appreciated that in other embodiments, one or more of the systems, devices, or servers may be combined into a single system, device, or server, or be made up of multiple systems, devices, or servers. It should be understood that the servers, systems, and devices described herein illustrate one embodiment of the invention. It is further understood that one or more of the servers, systems, and devices can be combined in other embodiments and still function in the same or similar way as the embodiments described herein.

The network 101 may be a system specific distributive network receiving and distributing specific network feeds and identifying specific network associated triggers. The network 101 may also be a global area network (GAN), such as the Internet, a wide area network (WAN), a local area network (LAN), or any other type of network or combination of networks. The network 101 may provide for wireline, wireless, or a combination wireline and wireless communication between devices on the network 101.

In some embodiments, the user 102 is an individual accessing a data transfer location, network location, interaction location, or the like. In one embodiment, the data stream may be generated or modified, for example, by one or more entity systems 120 while the data stream between the user device 110 and the entity system 120 is monitored by the secure data transfer system 130 over the network 101. In some embodiments a user 102 is a user requesting service from an entity or third party or entering a brick-and-mortar location associated with an entity or third party. In an alternative embodiment, the user 102 is an individual interacting with the secure data transfer system 130 over the network 101 and monitoring input of information from the entity systems 120 to the secure data transfer system 130 for processing and analysis (e.g., an employee of the entity operating and/or monitoring the systems 120, 130).

FIG. 2 provides a block diagram of a user device 110, in accordance with one embodiment of the invention. The user device 110 may generally include a processing device or processor 202 communicably coupled to devices such as, a memory device 234, user output devices 218 (e.g., a user display device 220, or a speaker 222), user input devices 214 (e.g., a microphone, keypad, touchpad, touch screen, and the like), a communication device or network interface device 224, a power source 244, a clock or other timer 246, a visual capture device such as a camera 216, a positioning system device 242, such as a geo-positioning system device like a GPS device, an accelerometer, and the like. In one embodiment, the camera 216 may include a scanner or any other image capturing device. The processing device 202 may further include a central processing unit 204, input/output (I/O) port controllers 206, a graphics controller or graphics processing device (GPU) 208, a serial bus controller 210 and a memory and local bus controller 212.

The processing device 202 may include functionality to operate one or more software programs or applications, which may be stored in the memory device 234. For example, the processing device 202 may be capable of operating applications such as the user application 238. The user application 238 may then allow the user device 110 to transmit and receive data and instructions from the other devices and systems of the environment 100 while providing access to a generated data stream tailored for the user device 110 and associated user. The user device 110 comprises computer-readable instructions 236 and data storage 240 stored in the memory device 234, which in one embodiment includes the computer-readable instructions 236 of a user application 238. In some embodiments, the user application 238 allows a user 102 to access and/or interact with other systems such as the entity system 120. In some embodiments, the user application 238 is an application for requesting interactions with other systems and devices and accessing data transfer locations associated with said interactions.

The processing device 202 may be configured to use the communication device 224 to communicate with one or more other devices on a network 101 such as, but not limited to the entity system 120 and the secure data transfer system 130. In this regard, the communication device 224 may include an antenna 226 operatively coupled to a transmitter 228 and a receiver 230 (together a "transceiver"), modem 232. The processing device 202 may be configured to provide signals to and receive signals from the transmitter 228 and receiver 230, respectively. The signals may include signaling information in accordance with the air interface standard of the applicable BLE standard, cellular system of the wireless telephone network and the like, that may be part of the network 101. In this regard, the user device 110 may be configured to operate with one or more air interface standards, communication protocols, modulation types, and access types. By way of illustration, the user device 110 may be configured to operate in accordance with any of a number of first, second, third, fourth, and/or fifth-generation communication protocols and/or the like. For example, the user device 110 may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Universal Mobile Telecommunications System (UMTS), CDMA2000, wideband CDMA (WCDMA) and/or time division-synchronous CDMA (TD-SCDMA), with fourth-generation (4G) wireless communication protocols, with fifth-generation (5G) wireless communication protocols, and/or the like. The user device 110 may also be configured to operate in accordance with non-cellular communication mechanisms, such as via a wireless local area network (WLAN) or other communication/data networks. The user device 110 may also be configured to operate in accordance Bluetooth® low energy, audio frequency, ultrasound frequency, or other communication/data networks.

The user device 110 may also include a memory buffer, cache memory or temporary memory device operatively coupled to the processing device 202. Typically, the one or more applications 238, are loaded into the temporarily memory during use. As used herein, memory may include any computer readable medium configured to store data, code, or other information. The memory device 234 may include volatile memory, such as volatile Random Access Memory (RAM) including a cache area for the temporary storage of data. The memory device 234 may also include non-volatile memory, which can be embedded and/or may be removable. The non-volatile memory may additionally or alternatively include an electrically erasable programmable read-only memory (EEPROM), flash memory or the like.

FIG. 3 provides a block diagram of a secure data transfer system 130, in accordance with one embodiment of the invention. The secure data transfer system 130 generally comprises a controller 301, a communication device 302, a processing device 304, and a memory device 306.

As used herein, the term "controller" generally refers to a hardware device and/or software program that controls and manages the various systems described herein such as the user device 110, the entity system 120, third party systems 140, and/or the secure data transfer system 130, in order to interface and manage data flow between systems while executing commands to control the systems. In some embodiments, the controller may be integrated into one or more of the systems described herein. In other embodiments, the controller may be a separate system or device. In some embodiments, the controller may perform one or more of the processes, actions, or commands described herein.

As used herein, the term "processing device" or "processor" generally includes circuitry used for implementing the communication and/or logic functions of the particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device may include functionality to operate one or more software programs based on computer-readable instructions thereof, which may be stored in a memory device.

The processing device 304 is operatively coupled to the communication device 302 and the memory device 306. The processing device 304 uses the communication device 302 to communicate with the network 101 and other devices on the network 101, such as, but not limited to the user device 110 and the entity system 120. As such, the communication device 302 generally comprises a modem, server, or other device for communicating with other devices on the network 101.

As further illustrated in FIG. 3, the secure data transfer system 130 comprises computer-readable instructions 310 stored in the memory device 306, which in one embodiment includes the computer-readable instructions 310 of a secure data transfer application 312, a proxy server application 320, and a transfer location appearance modification application 322. The secure data transfer application 312 is configured to receive user device requests for access to data transfer locations (e.g., web sites) and complete request to perform interactions between users and interaction providers. The proxy server application 320 is configured to intercept, monitor, and control stream of data between a user device and one or more other systems (e.g., third party systems 140) by installing a proxy server between the point of origination and the destination of the communication. The proxy server application 320 may be embodied as software, wherein the proxy server application 320 operates on the secure data transfer system 130 or is installed on another device such as the user device 110. In another embodiment, the proxy server application 320 leverages the hardware of the secure data transfer system 130 to act as a computer hardware appliance proxy server through which a communication data stream may be passed and controlled. The transfer location appearance modification application 322 is configured to modify an appearance of data transfer locations during interactions with user devices described herein. For example, the transfer location appearance modification application 322 may be configured to modify an visual appearance of a data transfer location before the location is presented to the user on a display of a user device.

In some embodiments, the memory device 306 includes data storage 308 for storing data related to the system environment, but not limited to data created and/or used by the secure data transfer application 312, proxy server application 320, and transfer location appearance modification application 322. Data stored in the data storage 308 may comprise a verified interaction provider database 314, an interaction database 316, and a user identification database 318.

The verified interaction provider database 314 is used to store information associated with interaction providers with whom user devices in the system may request interactions. The provider information stored in the database 314 may be verified by the system through communication with one or more other systems such as regulating body systems, public database systems, licensing systems, and other third party systems 140. While the resource token storage 314 is shown in FIG. 3 as part of the secure data transfer system 130, in other embodiments, resource token storage may be included on one or more other systems (e.g., entity systems 120) to supplement or as an alternative to resource token storage 314 on the secure data transfer system 130. In one embodiment, a verified interaction provider database is stored on the entity systems 120, wherein the secure data transfer system 130 pulls the files from the entity systems 120.

The interaction database 316 is used to store information regarding past interactions (e.g., transactions, account actions, interaction with the data stream, etc.) during a session with the user 102. In some embodiments, the interaction database 316 may be configured to store data from an incoming data stream in real-time. The interaction database 316 may further include information or data related to the interactions such as user data, user selections, and the like. The system may be configured to access and update stored information and data stored in the interaction database 316 as additional information is collected.

In one embodiment of the invention, the secure data transfer system 130 may associate with applications having computer-executable program code that instruct the processing device 304 to perform certain functions described herein. In one embodiment, the computer-executable program code of an application associated with the user device 110, third party systems 140, and/or the entity systems 120 may also instruct the processing device 304 to perform certain logic, data processing, and data storing functions of the application.

Embodiments of the secure data transfer system 130 may include multiple systems, servers, computers or the like maintained by one or many entities. In some embodiments, the secure data transfer system 130 may be part of the entity systems 120. In other embodiments, the entity systems 120 are distinct from the secure data transfer system 130. The secure data transfer system 130 may communicate with the entity systems 120 via a secure connection generated for secure encrypted communications between the two systems either over the network 101 or alternative to the network 101.

As illustrated in detail in FIG. 4, the environment 100 further includes one or more entity systems 120 which are connected to the user device 110, the secure data transfer system 130, and the third party systems 140. The entity systems 120 may be associated with one or more entities, institutions or the like. The entity systems 120 generally comprise a communication device 402, a processing device 404, and a memory device 406 further comprising data storage 408. The entity systems 120 comprise computer-readable instructions 410 stored in the memory device 406, which in one embodiment includes the computer-readable instructions of an entity application 412 and an interaction application 414. The entity systems 120 may communicate with the user device 110, third party systems 140, and the secure data transfer system 130 to provide access to information and accounts stored and maintained on the entity systems 120. In some embodiments, the entity system 120 may communicate with the secure data transfer system 130 during an interaction with a user 102 in real-time, wherein user interactions may be monitored and processed by the secure data transfer system 130. In some embodiments, data storage 408 comprises a verified interaction provider database 416 to either supplement or replace storage 314 of the secure data transfer system 130 as previously discussed.

The systems of the environment 100 are configured to provide a novel approach for securely completing data transfer interactions between devices by generating a database of verified interaction providers. The system is configured to collect and verify provider information to generate said database of trusted entities and/or users. While using the generated database, the system is configured to monitor data transfer traffic and other network communication with a user device that has allowed the system access. The system accomplishes this monitoring through the installation of a proxy server on the user device and/or over a data transfer location associated with a provider. The system is configured to determine from the monitored communications that a user device has accessed a data transfer location associated with a provider. In some embodiments, if the identified interaction provider is in the database of verified interaction providers, the system is configured to complete a requested interaction with the user device (e.g., a data transfer or other communication).

In addition to monitoring the data stream between devices and authorizing interactions using the generated database, the system is further configured to automatically complete portions of the data transfer itself using the information stored in the verified database in order to increase the speed at which interactions may be completed while still providing the enhanced security as previously discussed. For example, the system may be configured to modify an appearance of the data transfer location based on this interaction data and present the modified appearance to a user. In this way, the system may present the data transfer location to the user device while retaining security and visual elements of another data transfer location associated with the system or a trusted, maintaining entity for increased user confidence while the user completes the interaction.

FIG. 5 provides a high level process flow for completing a secure data transfer, in accordance with one embodiment of the invention. As illustrated in block 510 of FIG. 5, the system is first configured to generate a database of verified interaction providers. Interaction providers, as used herein, may comprise, for example, a user, an entity, a business, merchant, or vendor, an organization, a financial institution, or a government organization or the like that is not a financial institution. In some embodiment, an interaction provider may be a business, vendor, or the like that provides a resource (e.g., goods, services, or other resources) to another user or entity via an interaction at an interaction location.

The system is configured to collect information and data associated with interaction providers and store the information and data in a database to be referenced and called upon for later interactions. By adding and sorting the providers in the verified database, the system is able to improve the amount of time required for secure interactions with said verified providers, as the providers have been preemptively verified by system thereby requiring fewer security steps at the time of a new interaction. Additionally, previously collected information associated with the verified providers may be automatically inserted or used to populate an interaction with another user to further improve interaction speed.

Interaction providers are investigated and verified by the system prior to being added to the verified interaction provider database. In some embodiments, provider information is extracted by the system or transmitted by a user, entity, interaction provider, or the like to verify an identify and/or status of the user, entity, or interaction provide. For example, in one embodiment, an interaction provider may provide the system with verifiable information associated with the existence or a standing of the provider, data security information (e.g., types of active protection employed by the provider), and other provider information. In some embodiments, the provider information is verified by the system through communication with one or more third party systems (e.g., regulating bodies or agencies, public records, or the like) configured to verify the provided information. In some embodiments, interaction providers may proactively request that they be added to the verified interaction provider database, wherein the interaction provider transmits verified or verifiable information to the system for investigation and confirmation. In some embodiments, a new interaction provider may be investigated and potentially verified at a time of an interaction with the new interaction provider.

In some embodiments, the system may maintain one or more divisions within the generated verified interaction provider database. In some embodiments, the database may comprise separated levels of verified status between different providers based on one or more of the resources (e.g., goods and services) offered by the provider, the interaction type associated with the provider, the type of data transferred during interactions with the provider, and the like. For example, stricter requirements for verifying a provider may be required for providers associated with higher security interactions, wherein sensitive user data is transferred during the interaction. In some embodiments, the system may maintain additional categories within the database for non-verified or verification-pending interaction providers. In yet another embodiment, the system may maintain an additional category or division for non-secure or flagged interaction providers whose verifications were rejected or revoked due to data security concerns associated with past interactions or identified changes in the interaction providers' credentials or verification information.

As illustrated in block 520, the system is configured to determine that a user device has accessed a data transfer location associated with an interaction provider. An interaction location, as used herein, may include any physical and/or network location associated with an interaction, wherein resources and/or data are transferred between parties during the interaction. Non-limiting examples of interaction or data transfer locations include brick-and-mortar locations, within an application, a website, or the like. In some embodiments, an interaction or data transfer location may be a combination of physical and network locations. For example, an interaction location may comprise a user device used to complete an interaction with a provider device at a brick-and-mortar location. In another example, an interaction location may comprise an application or web site accessed through a physical device.

In some embodiments, the system determines that a user device has accessed a data transfer location through monitoring of a data stream of the user device over one or more network communication channels with the user's permission. The system may analyze the monitored data stream to determine that the user device has accessed one or more data transfer locations. Indication of access to a data transfer location may include capture and identification of location meta data, cookies, certificates, or other pieces of location identification data. In other embodiment, the system determines user access through a request to access a data transfer location sent from a user device when opening a communication channel to the location. In some embodiments, the system determines user access after a user device has initiated an interaction or data transfer with a data transfer location associated with an interaction provider.

As illustrated in block 530, the system is configured to install a proxy server over the data transfer location. In various embodiments, the proxy server may be embodied as hardware (e.g., a network appliance or box), software (e.g., a mobile application, a server application), or a combination of hardware and software across a system environment of networked devices. The proxy server acts as a middle layer or gateway between the user device and the data transfer location and/or interaction provider to provide enhanced security to the user device and user during an interaction. In some embodiments, data transfer traffic between the user device and the interaction provider is routed through and monitored by the proxy server of the system.

In some embodiments, install the proxy server over the data transfer location may comprise installing a proxy server application on the user device itself, wherein, with permission of the user (i.e., opt-in), the system may monitor a data flow between the user device and a plurality of data transfer locations. In other embodiments, the proxy server may be embodied as a separate hardware appliance such as secure data transfer system 130 of environment 100, wherein a data stream from the user device is routed through and monitored through the separate appliance. In yet another embodiment, installation of the proxy server may comprise layering a proxy server mask, layer, or the like over a device location itself with permission of the associated interaction provider. In some embodiments, the system is configured to install the proxy server over a data transfer location after an associated interaction provider is added to the verified interaction provider database. In some embodiments, the system is configured to preemptively install a proxy server before a user device accesses a data transfer location.

Once the proxy server is installed, as illustrated in block 540, the system is configured to determine, via the proxy server, that the user device has requested an interaction at the data transfer location. In some embodiments, an interaction comprises a data transfer between the user device and the interaction provider associated with the location in order to complete the interaction. For example, an interaction with a merchant may include a transfer of sensitive user information such as payment and/or other identifying information. In some embodiments, once a requested interaction involving a data transfer as described herein is detected by the system via the proxy server, the system is configured to temporarily prevent the data transfer from occurring until the interaction provider associated with the interaction can be verified by the system. Although the interaction temporarily prevented or paused by the system, in some embodiments, the system is configured to verify and complete an interaction in a near-instantaneous time frame relative to a user.

In one embodiment, the proxy server is an application installed on the user device, wherein the data transfer location is another application installed on the same user device. In this embodiment, the proxy server is configured to operate as a supplementary, second application that is in communication with the primary data transfer location application to transmit data (e.g., user input, command, data, and the like) from the user device and the data transfer location. For example, the data transfer location may be merchant or shopping application installed on a user device, wherein the supplementary proxy server application securely routes sensitive user information to the merchant application based on the merchant being a verified provider in the generated database.

As illustrated in block 550, the system is configured to determine that the interaction provider associated with the data transfer location is in the database of verified interaction providers. The system may reference the generated database of verified users to determine the provider's status. As previously discussed, if the system determines that the provider is a new provider not contained in the database, the system may be configured to attempt to verify the new provider's status in real-time at the time of the requested interaction.

As illustrated in block 560, the system is configured to complete the data transfer through the proxy server in response to determining that the interaction provider is in the database of verified interaction providers. In other embodiments, the system may determine that the interaction provider is not a verified provider and reject the interaction or data transfer. In some embodiments, the system may require additional verification or security steps from the user device and/or the interaction provider if the interaction provider is not already in the verified interaction provider database.

In some embodiments, the system is further configured to automatically complete a portion of the data transfer in response to determining that the interaction provider is in the database of verified interaction providers. In some embodiments, automatically completing a portion of the data transfer comprises populating the data transfer location with interaction data associated with the user, user device, and/or interaction provider. For example, the system may automatically populate one or more fields (e.g., name, address, payment information, shipping information, etc.) with user and/or interaction provider information.

In some embodiments, the system is configured to modify an appearance of the data transfer location based on this interaction data and present the modified appearance to a user on a display of a user device. The system may modify the displayed appearance of the data transfer location with at least one of the verified provider information and the user information associated with a user of the user device. The system may then cause the user device to present or display the modified appearance on the user device. For example, the system may present portions of a user's information embedded or merged in the appearance of the data transfer location or bring in visual elements (e.g., logos, fonts, advertisements) of a verified third party interaction provider into an internal interaction location.

In this way, the system may present the data transfer location to the user device while retaining security and visual elements of another data transfer location associated with the system or a trusted, maintaining entity for increased user confidence while the user completes the interaction. Additionally, the system may maintain a user at one, secure data transfer location (e.g., a location associated with an entity maintaining the system) while providing the appearance and feel of another data transfer location associated with an interaction provider included in the interaction.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, applications, micro-code, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein. As used herein, a processor may be "configured to" perform a certain function in a variety of ways, including, for example, by having one or more special-purpose circuits perform the functions by executing one or more computer-executable program code portions embodied in a computer-readable medium, and/or having one or more application-specific circuits perform the function. As such, once the software and/or hardware of the claimed invention is implemented the computer device and application-specific circuits associated therewith are deemed specialized computer devices capable of improving technology associated with data transfer security.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

It will further be understood that some embodiments of the present invention are described herein with reference to flowchart illustrations and/or block diagrams of systems, methods, and/or computer program products. It will be understood that each block included in the flowchart illustrations and/or block diagrams, and combinations of blocks included in the flowchart illustrations and/or block diagrams, may be implemented by one or more computer-executable program code portions. These one or more computer-executable program code portions may be provided to a processor of a special purpose computer for conditionally completing secure data transfers, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

INCORPORATION BY REFERENCE

To supplement the present disclosure, this application further incorporates entirely by reference the following commonly assigned patent applications:

| U.S. patent application Ser. No. | Title | Filed On |
|---|---|---|
| 16/860,950 | SYSTEM FOR GENERATION AND MAINTENANCE OF VERIFIED DATA RECORDS | Concurrently herewith |

What is claimed is:

1. A system for secure data transfer, the system comprising:
   a memory device with computer-readable program code stored thereon;
   a communication device connected to a network;
   a processing device, wherein the processing device is configured to execute the computer-readable program code to:
      generate a database of verified interaction providers comprising verified provider information;
      receive, from an interaction provider, a request to be added to the database, wherein the request comprises provider information and data security protections employed by the interaction provider;
      attempt, in response to receiving the request, to verify the provider information via communication with one or more third party systems;
      store, in response to a successful attempt to verify the provider information, the provider information and the data security protections in the database;
      install, in response to the successful attempt to verify the provider information, a proxy server over a data transfer location associated with the interaction provider, wherein the data transfer location comprises a physical location and a network location;
      monitor a data stream of a user device over one or more network communication channels;
      analyze the data stream to identify location identification data comprising location metadata and certificates;
      determine, based on the location metadata and the certificates, that the user device has accessed the data transfer location associated with the interaction provider;
      route, based on determining that the user device has accessed the data transfer location, data transfer traffic between the user device and the interaction provider through the proxy server;
      determine, via the proxy server, that the user device has requested an interaction at the data transfer location, wherein the interaction comprises a transfer of payment information from the user device to the interaction provider;
      determine that the interaction provider associated with the data transfer location is in the database of verified interaction providers; and
      in response to determining that the interaction provider is in the database, complete the data transfer through the proxy server.

2. The system of claim 1, wherein the proxy server is an application installed on the user device.

3. The system of claim 2, wherein the data transfer location is a first application installed on the user device and the proxy server is a second application installed on the user device, wherein the proxy server is configured to communicate with the data transfer location on the user device to complete the data transfer.

4. The system of claim 3, wherein the proxy server is configured to input user commands to the data transfer location on behalf of the user device.

5. The system of claim 1, wherein the processing device is further configured to execute the computer-readable program code to automatically complete a portion of the data transfer.

6. The system of claim 5, wherein the processing device is further configured to execute the computer-readable program code to, when automatically completing the portion of the data transfer, populate the data transfer location with interaction data associated with the user device and the interaction provider.

7. The system of claim 1, wherein the processing device is further configured to execute the computer-readable program code to:
   modify an appearance of the data transfer location with at least one of the provider information and user information associated with a user of the user device; and
   present the modified appearance of the data transfer location to the user device.

8. The system of claim 1, wherein the proxy server is configured to monitor the data transfer traffic between the user device and a plurality of data transfer locations with approval of the user device.

9. A computer-implemented method for secure data transfer, the computer-implemented method comprising:
   generating a database of verified interaction providers comprising verified provider information;
   receiving, from an interaction provider, a request to be added to the database, wherein the request comprises provider information and data security protections employed by the interaction provider;
   attempting, in response to receiving the request, to verify the provider information via communication with one or more third party systems;
   storing, in response to a successful attempt to verify the provider information, the provider information and the data security protections in the database;
   installing, in response to the successful attempt to verify the provider information, a proxy server over a data transfer location associated with the interaction provider, wherein the data transfer location comprises a physical location and a network location;
   monitoring a data stream of a user device over one or more network communication channels;
   analyzing the data stream to identify location identification data comprising location metadata and certificates;
   determining, based on the location metadata and the certificates, that the user device has accessed the data transfer location associated with the interaction provider;
   routing, based on determining that the user device has accessed the data transfer location, data transfer traffic between the user device and the interaction provider through the proxy server;
   determining, via the proxy server, that the user device has requested an interaction at the data transfer location, wherein the interaction comprises a transfer of payment information from the user device to the interaction provider;
   determining that the interaction provider associated with the data transfer location is in the database of verified interaction providers; and
   in response to determining that the interaction provider is in the database, completing the data transfer through the proxy server.

10. The computer-implemented method of claim 9, wherein the proxy server is an application installed on the user device.

11. The computer-implemented method of claim 10, wherein the data transfer location is a first application installed on the user device and the proxy server is a second application installed on the user device, wherein the proxy server is configured to communicate with the data transfer location on the user device to complete the data transfer.

12. The computer-implemented method of claim 11, wherein the proxy server is configured to input user commands to the data transfer location on behalf of the user device.

13. The computer-implemented method of claim 9, further comprising automatically completing a portion of the data transfer.

14. The computer-implemented method of claim 13, wherein automatically completing the portion of the data transfer further comprises populating the data transfer location with interaction data associated with the user device and the interaction provider.

15. The computer-implemented method of claim 9, further comprising:
modifying an appearance of the data transfer location with at least one of the provider information and user information associated with a user of the user device; and
presenting the modified appearance of the data transfer location to the user device.

16. The computer-implemented method of claim 9, wherein the proxy server is configured to monitor the data transfer traffic between the user device and a plurality of data transfer locations with approval of the user device.

17. A computer program product for secure data transfer, wherein the computer program product comprises a non-transitory computer-readable medium comprising computer-readable instructions, the computer-readable instructions, when executed by a processing device, cause the processing device to:
generate a database of verified interaction providers comprising verified provider information;
receive, from an interaction provider, a request to be added to the database, wherein the request comprises provider information and data security protections employed by the interaction provider;
attempt, in response to receiving the request, to verify the provider information via communication with one or more third party systems;
store, in response to a successful attempt to verify the provider information, the provider information and the data security protections in the database;
install, in response to the successful attempt to verify the provider information, a proxy server over a data transfer location associated with the interaction provider, wherein the data transfer location comprises a physical location and a network location;
monitor a data stream of a user device over one or more network communication channels;
analyze the data stream to identify location identification data comprising location metadata and certificates;
determine, based on the location metadata and the certificates, that the user device has accessed the data transfer location associated with the interaction provider;
route, based on determining that the user device has accessed the data transfer location, data transfer traffic between the user device and the interaction provider through the proxy server;
determine, via the proxy server, that the user device has requested an interaction at the data transfer location, wherein the interaction comprises a transfer of payment information from the user device to the interaction provider;
determine that the interaction provider associated with the data transfer location is in the database of verified interaction providers; and
in response to determining that the interaction provider is in the database, complete the data transfer through the proxy server.

18. The computer program product of claim 17, wherein the proxy server is an application installed on the user device.

19. The computer program product of claim 18, wherein the data transfer location is a first application installed on the user device and the proxy server is a second application installed on the user device, wherein the proxy server is configured to communicate with the data transfer location on the user device to complete the data transfer.

20. The computer program product of claim 17, wherein the computer-readable instructions, when executed by the processing device, further cause the processing device to automatically complete a portion of the data transfer.

* * * * *